Figure 6:
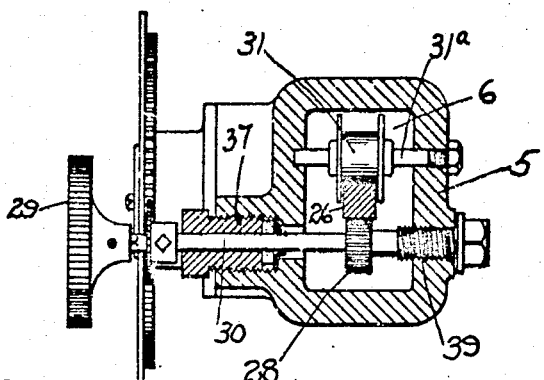

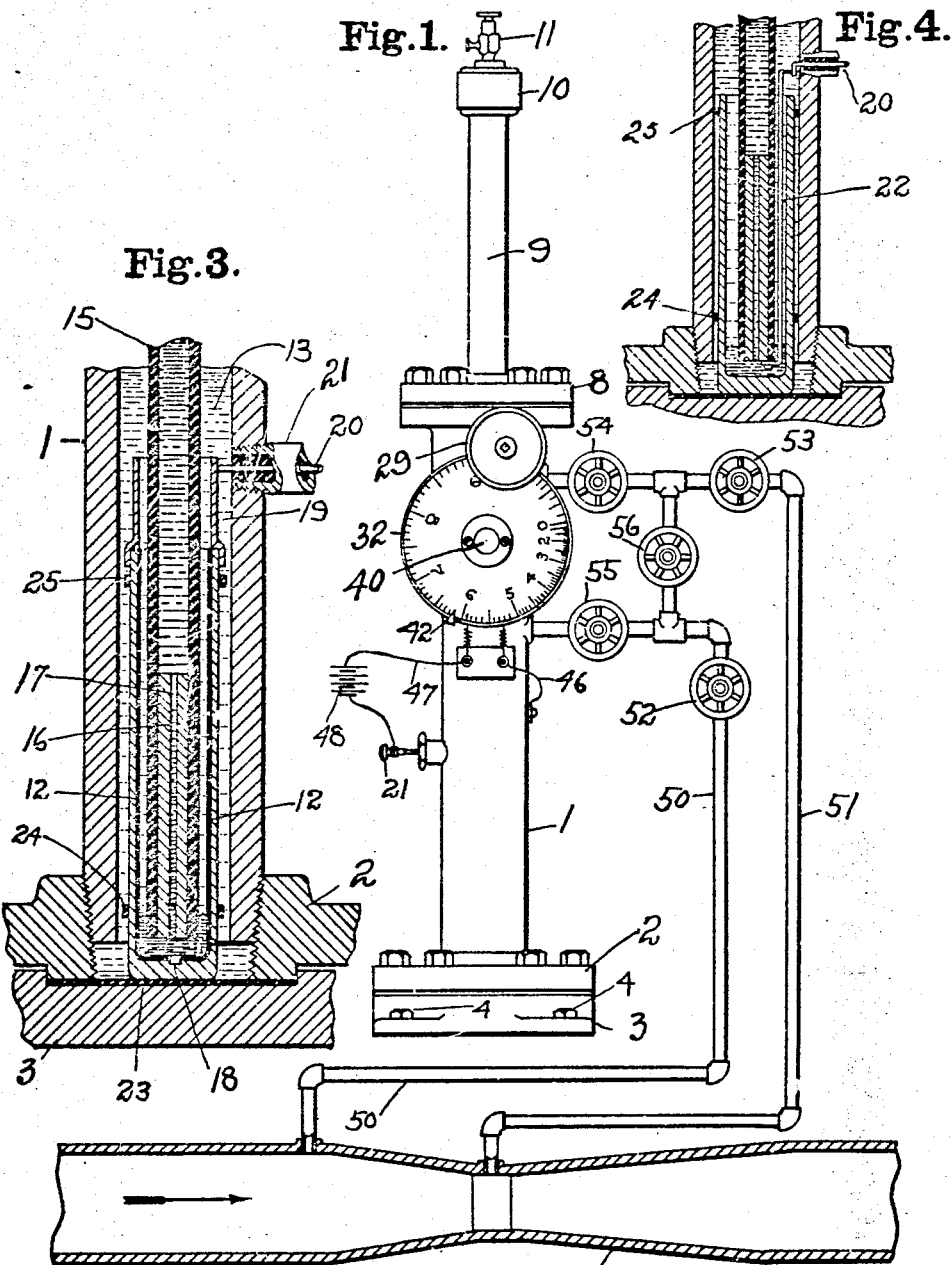

F. N. CONNET.
RATE INDICATING DEVICE FOR FLUIDS.
APPLICATION FILED DEC. 21, 1908.

960,275.

Patented June 7, 1910.
2 SHEETS—SHEET 2.

WITNESSES
Willard W. Bardsley.
E. I. Ogden

INVENTOR
FREDERICK N. CONNET.

Howard E. Barlow
ATTORNEY

UNITED STATES PATENT OFFICE.

FREDERICK N. CONNET, OF PROVIDENCE, RHODE ISLAND.

RATE-INDICATING DEVICE FOR FLUIDS.

960,275.   Specification of Letters Patent.   Patented June 7, 1910.

Application filed December 21, 1908. Serial No. 468,525.

*To all whom it may concern:*

Be it known that I, FREDERICK N. CON-NET, a citizen of the United States, residing at the city of Providence, in the county of Providence and State of Rhode Island, have invented certain new and useful Improvements in Rate-Indicating Devices for Fluids, of which the following is a specification, reference being had therein to the accompanying drawing.

This invention relates to manometers and provides a practical instrument of simple construction for indicating the rate of flow of liquids or gases through a tube or aperture of a given size.

This device is designed to work under heavy pressures, such for instance as the high pressure fire service for reaching tall buildings, for pipe lines through which oil, water or other liquids or gases are pumped, or other purposes for which the same may be adapted. This instrument is more particularly adapted to be used in connection with the Venturi meter tube and to be operated by hand whereby it is caused to indicate the rate of flow through the meter tube at the time of observation.

The instrument contains two chambers, the lower one of which is connected to the up-stream pressure of the meter tube, while the upper chamber is connected to the throat pressure of said tube. In the lower chamber is a well partly filled with mercury, and a tube of insulating material, such as hard rubber, is connected with the upper chamber and extends downward into this mercury well, whereby the water pressure in the lower chamber in acting upon said mercury forces the same up the tube to a height proportional to the difference between the pressures in the two chambers; therefore the height to which the mercury is forced in the said inner tube is a measure of the velocity of the water flowing through the meter tube.

The old method of ascertaining the height of this mercury, while working under low pressures, was to use a graduated glass U-tube through which the movement of the mercury could be readily seen, but it is found in practice that glass cannot stand the extremely high pressures to which these instruments are subjected, therefore a simple means has been provided whereby the height of the mercury, and thereby the rate of flow, may be indicated on the outside of the instrument. To accomplish this reading in a simple manner the mercury in the tube and well is insulated from the frame of the machine. A vertically adjustable metal rack or strip is adapted to extend from the upper chamber down into the insulated tube so that its lower end, which is provided with a platinum point, may come in contact with the mercury completing an electric circuit, whereby a light or other electrically operated device indicating the completion of the circuit is operated. This rack is manipulated by means of a hand wheel through a shaft and pinion, the movement of which hand wheel also rotates a graduated dial in proportion to the movement of the rack. Therefore when the hand wheel is turned so as to lower the rack into proper engagement with the mercury the lamp is lighted and the reading on the dial at that time indicates the rate at which the water, or other fluid, is passing through the meter tube.

With these and other objects in view, the invention consists of certain novel features of construction, as will be more fully described and particularly pointed out in the appended claims.

Figure 2:
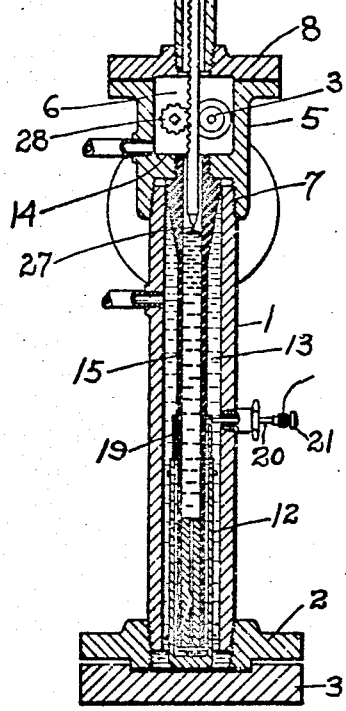
Figure 5:
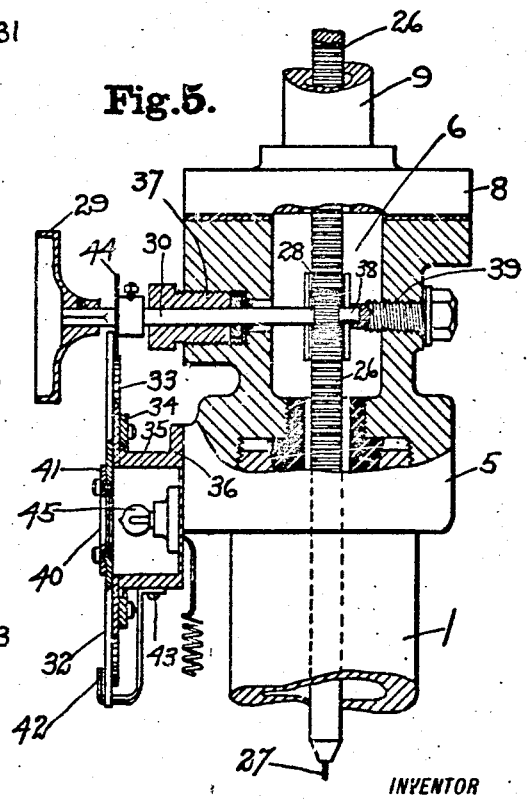

In the accompanying drawings: Figure 1— is a front elevation of the manometer showing the same connected up to a Venturi tube. Fig. 2— is a central sectional elevation from the rear of the machine. Fig. 3— is an enlarged view of a portion of the lower chamber of the machine showing the mercury well and illustrating one of the contact points electrically connected thereto. Fig. 4— illustrates a detail of the mercury well and another means of forming a connection with this contact point, which comprises a conducting wire leading from said point down into said well, the lower end to be submerged in the mercury therein. Fig. 5— is an enlarged view of a portion of the instrument showing the upper chamber in section to illustrate the operation of the hand wheel and the means for actuating both the rack and graduated dial. Fig. 6— is a plan view showing a transverse section through the upper chamber.

Referring to the drawings, 1 designates the tubular outer shell which forms the lower chamber of the instrument, the lower end of said tube being closed by means of flanges 2 and 3, which are bolted together to form a suitable joint, flange 3 also forming a base upon which the instrument is adapted to be set and through which it may be bolted at 4—4 to the floor or foundation.

An upper casing 5 is provided with a rectangular chamber 6 formed thereon, the lower end of said casing being connected to the upper end of the tubular shell 1 by being threaded as at 7 onto the same or by any other convenient means of connection.

A head or plate 8 is secured to the upper end of this casing into which is threaded an upwardly extending tube 9 for the reception of the strip or toothed rack hereinafter described, said tube being provided with a cap 10 at its upper end to which is secured an air valve 11.

A cup or well 12 is located in the lower end of chamber 13 and is for the purpose of receiving a portion of mercury used in the operation of the instrument. This well is therefore suitably lined on its internal surface with porcelain or other suitable material to prevent deteriorating action of the mercury upon the metal of which the well may be formed. This well is electrically insulated from the rest of the machine by the insulating plate 23 and the hands 24 and 25 which support said well and prevent the same from coming in contact with the outer shell 1.

In order to provide a suitable connection from the lower chamber 13 to the upper chamber 6 I have inserted a tube 15 of insulating material, such as hard rubber or the like, through the lower wall 14 of the casing 5, the lower end of which tube extends downward into the mercury well 12 nearly to the bottom thereof. A bushing 16 of porcelain or other suitable material, having a small central hole 17, through which the mercury may pass, is secured in the lower end of this inner tube so as to displace a portion of area of the tube, thereby requiring less mercury to operate the instrument. In order to form an electric connection to the mercury in this well the same may be constructed of cast iron or other suitable material, and have a small spot of its porcelain lining removed as at 18. A brass collar 19 may be attached to the upper end of the well cup with which the end of the pin 20 of the binding post 21 may come in contact, or a wire 22, as illustrated in Fig. 4, may extend from this contact pin down into the mercury in the bottom of the well for making the connection, if desired, or any other suitable or convenient means may be employed for making an electric connection to the mercury in the bottom of the well.

Located in the upper chamber 6 is a toothed rack 26 or other endwise movable member which is long enough to reach nearly to the bottom of tube 15. The upper portion of this rack extends up into the pipe 9 and is provided at its lower end with a platinum point 27 in order to sensitize the same to the action of the electric current when the lower end comes in contact with the mercury in the tube. This rack or member may be moved up and down by means of the actuating hand wheel 29, through a shaft 30 and intermeshing pinion 28. This shaft passes through a suitable packing gland 37 and its inner end 38 is provided with a bearing in the plug 39. A flanged idler pulley 31 mounted on the short shaft 31ª backs up said rack and keeps the same in constant mesh with the pinion 28. A graduated dial 32 is provided with a hollow central portion 40 in which a glass is set and retained by means of the collar 41. This dial is secured to the gear 33, which gear is provided with a center bearing collar 34, the whole being mounted and adapted to rotate on the hollow trunnion 35, which trunnion is fixed to the casing at 36.

A pointer or index finger 42 is supported from the trunnion at 43 and adapted to extend over the edge of the index disk.

A small pinion 44 is mounted on the shaft 30 and adapted to mesh with the gear 33, whereby when the hand wheel is turned to move the rack up and down it also gives a proportional circular motion to the index plate.

An incandescent lamp 45 is located within the central hub or trunnion 35, see Fig. 5. One terminal 46 of this lamp is connected to the frame of the instrument, and said frame is electrically connected to the platinum tipped metal rack through its contacting and operating pinion and shaft. The other terminal of the lamp is connected through wire 47 to one pole of an electric battery 48, see Fig. 1, the other pole of the battery being connected to the insulated terminal 21 above described, whereby the electric circuit is completed when the platinum tip is brought in contact with the mercury.

The operation of this measuring instrument may be more fully described as follows: The liquids or gases flow through the meter tube 49 in the direction of the arrow. The up stream side of the tube is connected by the pipe 50 to the lower chamber 13, while the throat is connected through the pipe 51 to the upper chamber 6. When there is no flow through the tube the pressure at all points therein is, of course, equal, and all the mercury in the instrument remains in the bottom of the well 12. As soon as the flow begins the pressure in the throat is decreased, becoming less than that at the upstream connection, the greater the rate of flow the greater the difference, and the mercury in the well is forced up into the insulated tube 15 a distance in proportion to the difference in the pressures at the two points in the tube.

While the electric incandescent light works well in practice and is very convenient for indicating the moment of completing the electric circuit, yet I do not restrict myself to this means of indicating, as an electric bell, voltmeter, or other electrically operated device may be employed for this purpose.

When it is desired to equalize the pressures in the two chambers, or test the instrument, the valves 52 and 53 are closed, valves 54 and 55 and the by-pass valve 56 are open, thus the water is allowed to circulate between the two chambers and equalize the pressure therein, at which time the reading on the dial should be zero at the moment the electrical contact indicating device is operated.

Having thus described my invention, what I claim as new and desire to secure by Letters Patent, is:

1. The combination with a meter tube, of a device provided with two chambers, means for connecting each of said chambers with different pressure points in said meter tube, fluids of two different gravities in one chamber, a connecting tube between said chambers through which the heavier liquid may be forced from one toward the other in proportion to the difference in pressures between said chambers, and manually operated means whereby the rate of flow through said meter tube may be indicated when desired.

2. The combination with a meter tube, of a device provided with two chambers, means for connecting each of said chambers with different pressure points in said meter tube, fluids of two different gravities in one chamber, a connecting tube between said chambers through which the heavier liquid may be forced from one toward the other, in proportion to the difference in pressures between said chambers, a normally open electric circuit in said device, means whereby said circuit may be completed through said heavy fluid when desired, and means for indicating the completion of said circuit.

3. The combination with a meter tube, of a device provided with two chambers, means for connecting each of said chambers with different pressure points in said meter tube, fluids of two different gravities in one chamber, a connecting tube between said chambers through which the heavier liquid may be forced from one toward the other in proportion to the difference in pressures between said chambers, a normally open electric circuit in said device, means whereby said circuit may be completed through said heavy fluid, means for indicating the completion of said circuit, and means operatively related to the circuit completing means for indicating the rate of flow through the meter tube at the time the circuit is completed.

4. The combination with a meter tube, of a device provided with two chambers, means for connecting each of said chambers with different pressure points in said meter tube, fluids of two different gravities in one chamber, a connecting tube between said chambers through which the heavier liquid may be forced from one toward the other in proportion to the difference in pressures between said chambers, an indicating device, means whereby said device may be manually operated, and electric means coöperating with the manually operated device to indicate the time for taking the reading from said indicating device.

5. The combination with a meter tube, of a device provided with two chambers, means for connecting each of said chambers with different pressure points in said meter tube, fluids of two different gravities in one chamber, a connecting tube between said chambers through which the heavier liquid may be forced from one toward the other in proportion to the difference in pressures between said chambers, a normally open electric circuit in said device, a movable member by which said circuit may be completed through said heavy fluid, means for indicating the completion of said circuit, and means operatively related to the circuit completing means whereby the rate of flow through the meter tube corresponding to the height of said fluid may be indicated.

6. The combination with a meter tube, of a device provided with two chambers, means for connecting each of said chambers with different pressure points in said meter tube, fluids of two different gravities in one chamber, a connecting tube between said chambers through which the heavier liquid may be forced from one toward the other in proportion to the difference in pressures between said chambers, a normally open electric circuit in said device, and hand operated movable means by which said circuit may be completed through said heavy fluid when desired, means for indicating the completion of said circuit, and means operatively related to the circuit completing means whereby the rate of flow through the meter tube corresponding to the height of said fluid is indicated when the electrical indicator is operated.

7. The combination with a meter tube, of a device provided with two chambers, means for connecting each of said chambers with different pressure points in said meter tube, fluids of two different gravities in one chamber, a connecting tube between said chambers through which the heavier liquid may be forced from one toward the other in proportion to the difference in pressures between said chambers, a normally open electric circuit in said device, a hand operated endwise movable rack by which said circuit may be completed through said heavy fluid when desired, electrical means for indicating the completion of said circuit, and a graduated dial geared to operate in unison with said rack whereby the rate of flow through the meter tube corresponding to the height of said fluid in indicated when read at the time indicated by the electrical device.

8. The combination with a meter tube, of a device provided with an upper and a lower chamber, means for connecting each of said chambers with different pressure points in said meter tube, a well containing mercury in the lower chamber, a tube communicating with the upper chamber and extending into said mercury well whereby said mercury is caused to rise in said tube to a height in proportion to the difference in pressures in said chambers, a normally open electric circuit in said device, means whereby said circuit may be completed through said mercury when desired, and means operatively related to the circuit completing means for indicating the rate of flow through the meter tube at the time said circuit is completed.

9. The combination with a meter tube, of a device provided with an upper and a lower chamber, means for connecting each of said chambers with different pressure points in said meter tube, a well containing mercury in the lower chamber, a tube communicating with the upper chamber and extending into said mercury well whereby the mercury is caused to rise in said tube to a height in proportion to the difference in pressures in said chambers, a normally open electric circuit in said device, a manually-operated endwise movable member adapted to be moved into engagement with the mercury in said tube when desired whereby said circuit may be completed, means for indicating the completion of the circuit, means operatively related to the circuit completing means for indicating the rate of flow through the meter tube at the time the completion of the circuit is indicated.

10. The combination with a meter tube, of a device provided with an upper and a lower chamber, means for connecting each of said chambers with different pressure points in said meter tube, a well in the lower chamber containing mercury, a tube communicating with the upper chamber and extending into said mercury well whereby the mercury is caused to rise in said tube to a height in proportion to the difference in pressures in said chambers, a normally open electric circuit in said device, a rack, a hand-operated means for moving said rack into engagement with the mercury in said tube whereby said circuit may be completed, means for indicating the completion of said circuit, and a rotatable graduated rate of flow indicating dial geared to be operated in unison with said rack whereby said rate is indicated on said dial at the time the circuit is completed.

11. The combination with a meter tube, of a device provided with two intercommunicating chambers, means for connecting each of said chambers with different pressure points in said meter tube, fluids of two different gravities in one chamber, a connecting tube between said chambers, the heavier fluid in said latter chamber being caused to move through said tube toward the second chamber a distance in proportion to the difference in pressures between that in said chambers, a normally open electric circuit in said device, means for completing said circuit through said heavy fluid, and means operatively related to the circuit completing means for indicating the rate of flow through the meter tube when said circuit is completed.

In testimony whereof I affix my signature in presence of two witnesses.

FREDERICK N. CONNET.

Witnesses:
 HERBERT J. BURROUGH.
 HOWARD E. BARLOW.